United States Patent
Kushihara

(10) Patent No.: US 6,774,593 B2
(45) Date of Patent: Aug. 10, 2004

(54) SENSOR SYSTEM FOR CONTROLLING A MOTOR

(75) Inventor: Hiroshi Kushihara, Nagano-ken (JP)

(73) Assignee: Tamagawa Seiki Kabushiki Kaisha, Nagano-Ken (JP)

( * ) Notice: Subject to any disclaimer, the term of this patent is extended or adjusted under 35 U.S.C. 154(b) by 100 days.

(21) Appl. No.: 10/292,585

(22) Filed: Nov. 13, 2002

(65) Prior Publication Data
US 2003/0102861 A1 Jun. 5, 2003

(30) Foreign Application Priority Data
Nov. 22, 2001 (JP) ........................................ 2001-357898

(51) Int. Cl.[7] .............................................. H02P 6/16
(52) U.S. Cl. ........................ 318/254; 318/439; 318/721
(58) Field of Search .............................. 318/138, 254, 318/439, 720, 721

(56) References Cited

U.S. PATENT DOCUMENTS

| 4,060,753 A | * | 11/1977 | Okuyama et al. | ........... 318/700 |
|---|---|---|---|---|
| 4,169,990 A | * | 10/1979 | Lerdman | ..................... 318/138 |
| 4,278,921 A | * | 7/1981 | Medding et al. | ............ 318/254 |
| 5,821,708 A | * | 10/1998 | Williams et al. | ............ 318/254 |
| 6,064,175 A | * | 5/2000 | Lee | ............................. 318/809 |
| 6,570,360 B1 | * | 5/2003 | Freeman | ..................... 318/798 |

* cited by examiner

*Primary Examiner*—Bentsu Ro
(74) *Attorney, Agent, or Firm*—Sughrue Mion, PLLC

(57) ABSTRACT

A sensor system for controlling a motor in a motor drive control system having a drive control circuit (4) that controls the driving of a motor (2) in accordance with an operation command, includes a main angle detecting unit (10) having a resolver (1) that detects the rotation angle of the motor (2) and a sub angle detecting unit (11) that estimates the rotation angle of the motor (2) on the basis of the counter electromotive power of the motor (2). The main angle detecting unit (10) detects the rotation angle of the motor (2) in a normal state, and the sub angle detecting unit (11) detects the rotation angle of the motor (2) when the main angle detecting unit (10) is in failure.

2 Claims, 2 Drawing Sheets

A CASE IN WHICH RESOLVER IS USED

A CASE IN WHICH THE COUNTER ELECTROMOTIVE VOLTAGE OF MOTOR IS USED

SENSOR SYSTEM FOR CONTROLLING A MOTOR

BACKGROUND OF THE INVENTION

1. Field of the Invention

The present invention relates to a sensor system used for controlling a motor, and more particularly, to a novel improvement for providing a fail-safe sensor system used for controlling a motor, which is small in size and low in price, and has high reliability and dynamic characteristics without using newly providing other system sensors.

2. Description of the Related Art

As a device of this type which has been employed up to now, there is a structure of a resolver as a sensor for controlling a motor, shown in FIG. 2A.

In FIG. 2A, reference numeral 1 denotes a resolver that detects the rotation angle of a brushless motor 2, and an angle signal 1a of the resolver 1 is converted into a digital signal by an R/D converter 3 and then inputted to a servo controller 4 that conducts drive control of the brushless motor 2. The brushless motor 2 is driven under control by using the rotation angle which is detected by the resolver 1.

Also, FIG. 2B is a diagram showing the structure of a device that estimates the rotation angle by using a counter electromotive voltage of the motor.

In the structure shown in FIG. 2B, the rotation angle of the brushless motor 2 is estimated on the basis of the counter electromotive voltage which is detected from the brushless motor 2, and an estimate value of the rotation angle is inputted to the servo controller 4, to thereby drive the brushless motor 2 under control.

However, the resolver shown in FIG. 2A is exclusively used as a sensor for rotation control of the brushless motor 2, but does not pay attention to the dynamic characteristics and does not positively aspire the effective utilization of the bruthless motor 2.

Also, although the estimate of the rotation angle of the brushless motor 2 in the structure shown in FIG. 2B is suitable for an intended use as the redundant system for fail-safe, there arises such a problem that smooth control is extremely difficult because stable rotation is not obtained due to load fluctuation or the like and the rotation vibration becomes large, and there also arises such a problem that stop or low-speed control is difficult. Thus, there arise many problems upon using the conventional device as a main detecting system.

SUMMARY OF THE INVENTION

The present invention has been made to solve the above-mentioned problems with the conventional art, and therefore an object of the present invention is to maintain and improve the global environment suffering a reduction of a coal oil resource by the diffusion of an electric motive energy for a good cause, and more particularly to provide a sensor system used for controlling a motor, which is small in size, and low in price, and has high reliability and dynamic characteristics without using new other system sensors.

According to the present invention, there is provided a sensor system for controlling a motor in a motor drive control system having a drive control circuit that controls the driving of a motor in accordance with an operation command, the system comprising a main angle detecting means having a resolver that detects the rotation angle of the motor; and a sub angle detecting means that estimates the rotation angle of the motor on the basis of the counter electromotive power of the motor. In this system, the main angle detecting means detects the rotation angle of the motor in a normal state, and the sub angle detecting means detects the rotation angle of the motor when the main angle detecting means is in failure. Further, the sub angle detecting means includes a counter electromotive voltage detecting means that detects the counter electromotive voltage of the motor, and an angle estimating means that estimates the rotation angle of the motor on the basis of the counter electromotive voltage.

BRIEF DESCRIPTION OF THE DRAWINGS

These and other objects, features and advantages of the present invention will become more apparent upon consideration of the following description of the preferred embodiments of the present invention taken in conjunction with the accompanying drawings, wherein.

DETAILED DESCRIPTION OF THE PREFERRED EMBODIMENTS

Now, a description will be given in more detail of an operation processing device for a resolver signal in accordance with a preferred embodiment of the present invention with reference to the accompanying drawings.

The same or like parts as those in the conventional device are designated by identical references and their description will be omitted.

Figure 1:
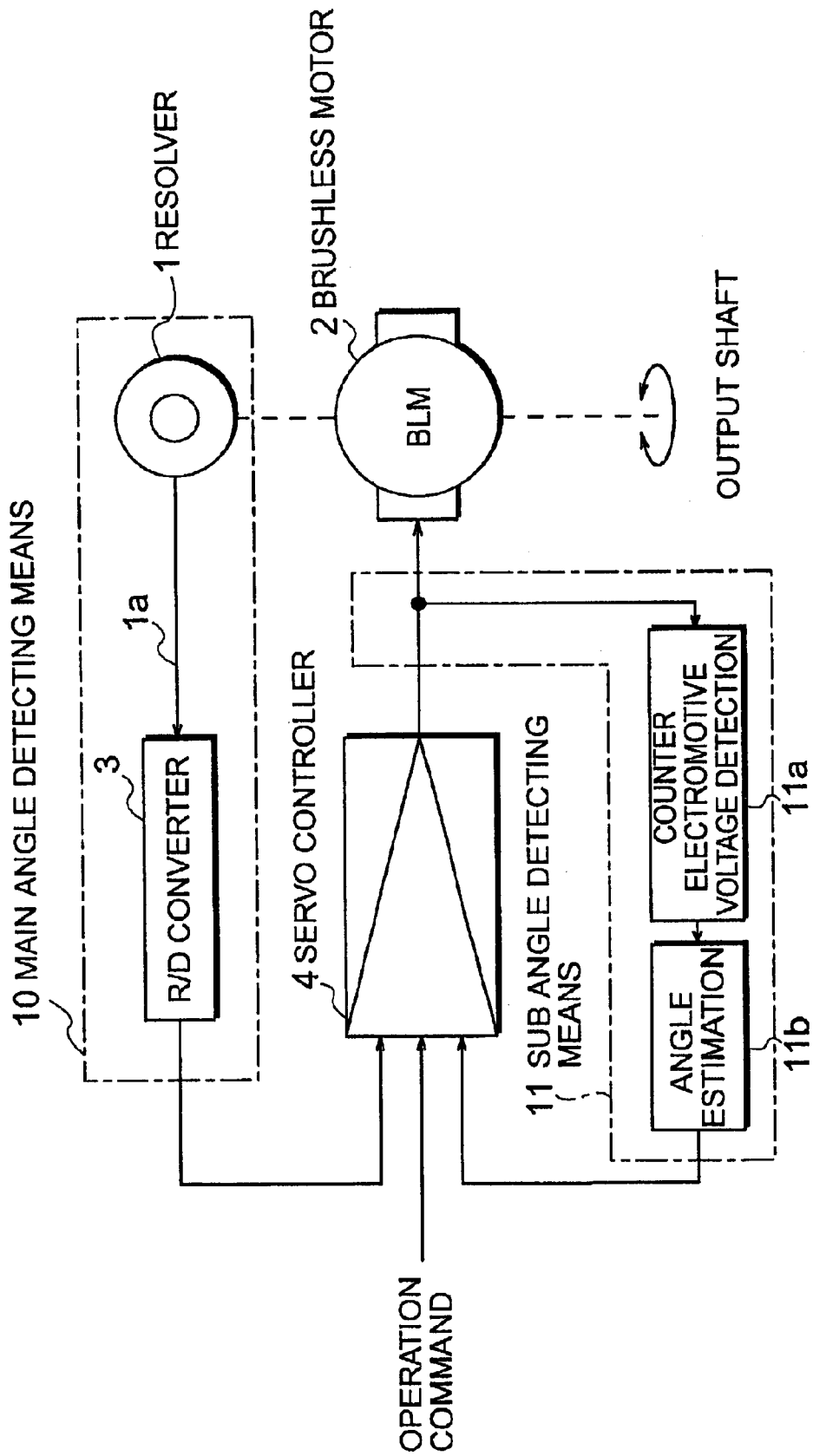
FIG. 1 is a structural diagram schematically showing a sensor system for controlling a motor in accordance with the present invention.
Figure 2A:
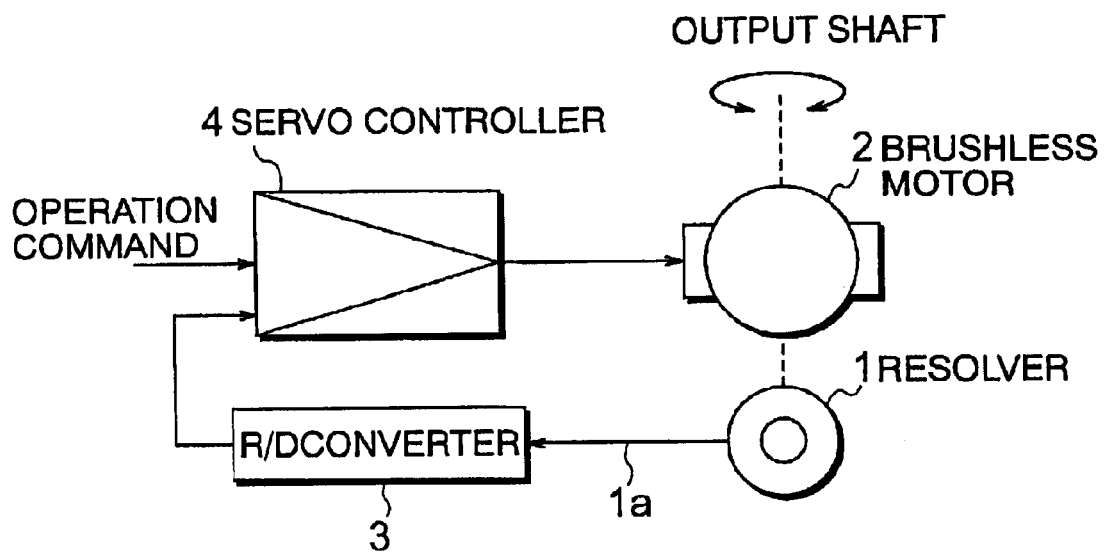
FIGS. 2A and 2B are structural diagrams schematically showing a conventional sensor system for controlling a motor.
Figure 2B:
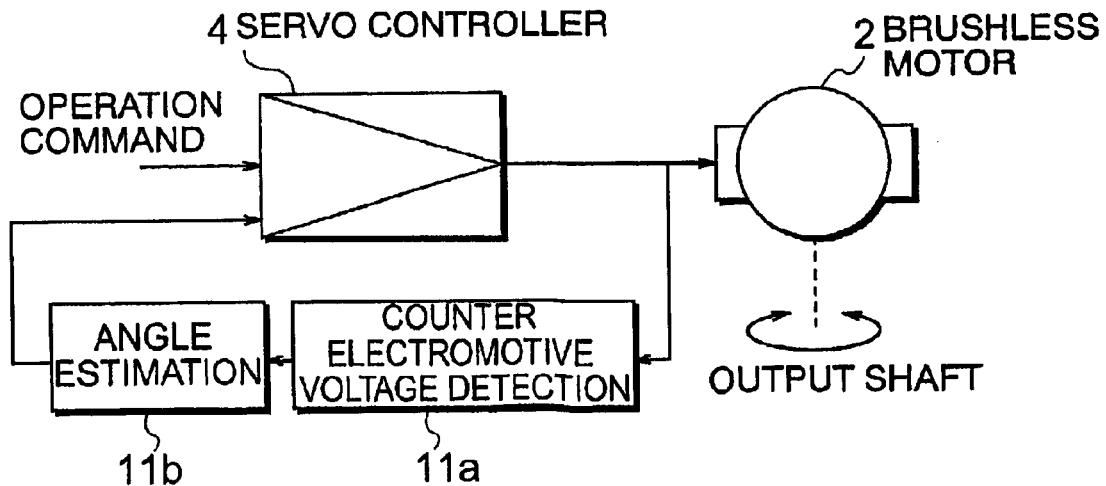

As shown in FIG. 1, a sensor system in motor control in accordance with the present invention is made up of a main angle detecting means 10 and a sub angle detecting means 11.

The main angle detecting means 10 is made up of a resolver 1 and an R/D converter 3 and digitalizes an angle signal 1a, which is detected by the resolver, by the R/D converter 3 to input a digitalized signal to a servo controller 4.

On the other hand, the sub angle detecting means 11 is made up of a counter electromotive voltage detecting means 11A and an angle estimating means 11B, and estimates the rotation angle of the brushless motor 2 on the basis of a counter electromotive voltage which is detected from the brushless motor 2 to input an estimate value of the rotation angle to the servo controller 4.

In the sensor system for controlling a motor thus structured, in a normal period, the rotation angle of the brushless motor 2 is detected by the main angle detecting means 10 to conduct the drive control. On the other hand, in a failure period of the main angle detecting means 10, the rotation angle of the brushless motor 2 is detected by using the sub angle detecting means 11, to thereby control the drive of the brushless motor 2.

In other words, the sub angle detecting means 11 is provided as a redundant system in order to ensure fail-safe when the main angle detecting means 10 fails. A simple system having no means for directly detecting the angle such as the resolver is disposed as the redundant system, thereby being capable of readily structuring a backup system for the main sensor system having the resolver 1.

Also, when a sensor which is high in heat resistance is used as in the resolver 1, it can be adapted to a large-current drive, and the load efficiency of the motor can be enhanced. Also, in particular, the combination of the sensor with the R/D converter which is excellent in dynamic characteristics such as an acceleration characteristic can suppress the deterioration of the control efficiency based on a dynamic angle detection error to the minimum even at the time of a dynamic response or even with respect to an accelerative disturbance load fluctuation, thereby being capable of downsizing the motor and providing a motor control system which is compact, low in price and high in reliability.

In general, in the case of detecting the rotation angle of the motor by using the resolver, it has been known that the control efficiency of the motor may be deteriorated by about 10% than in a case in which an encoder is employed. This is because an R/D conversion dynamic error (in particular, an acceleration response delay) may reach about 25° in an electric angle.

In order to escape from the above deterioration of the control efficiency, there is a treatment of increasing the motor itself by 20% in size as a tentative countermeasure. However, this brings on remarkable cost-up and also increase in size or weight of the motor.

Under the above circumstances, according to the present invention, the R/D converter which is inexpensive and excellent in dynamic characteristics (the speed dependency of the conversion error and the acceleration) is employed as the main angle detecting means 10. Also, the sub angle detecting means 11 that conducts the angle estimate in accordance with the counter electromotive voltage of the motor is employed as the redundant system to backup the main angle detecting means 10.

The sub angle detecting means 11 is adapted to ensure the fail-safe as the sub system that bears the emergency evacuative backup in a time of emergency although the reliability of the angle data is low, because the sub angle detecting means 11 estimates the rotation angle on the basis of the counter electromotive voltage of the motor.

In this example, the motor control efficiency $\eta$ can be found by $\eta = \cos \Delta\theta \times 100$ (%).

Also, the total electric angle error $\Delta\theta$ can be represented as $\Delta\theta = A + B + C$, where A is a systematic error including the assembling error of the motor or the resolver, a zero point error and so on, B is an error of the detection system which includes the static error of the resolver 1 or the R/D converter 3 and the dynamic error (caused by an error derived from a constant-speed following delay or an acceleration error), and C is an error of the drive system which is an error included in the control period and the time constant of the servo controller 4.

For example, in the case where an eight-pole motor is controlled by using a resolver having an axial double angle of 4×, on the assumption that a disturbance impact or the like occurs, the total electric angle error $\Delta\theta$ becomes 23.5° since A is about 4°, B is about 7.5° and C is about 12°.

In this case, the motor control efficiency $\eta = \cos (23.5°) \times 100 = 91.7$ (%).

Therefore, in the case where a large error occurs in the detected angle even momentarily due to the disturbance impact or the like, the motor control efficiency is decreased by 8.3% because the total electric angle error $\Delta\theta$ is 23.5° in the above case.

For that reason, since it is necessary to make a large amount of current flow to increase the load factor in order to compensate the amount of decrease of 8.3%, a larger motor by about 17.3% on the basis of $(1+0.083)^2 = 1.173$ must be employed for suppressing the heat generated by the motor (mainly copper loss).

On the contrary, in the sensor system in motor control according to the present invention, the rotation angle of the brushless motor 2 is detected by the main angle detecting means 10 in a normal state, the rotation angle of the brushless motor 2 is detected by the sub angle detecting means 11 when the mail angle detecting means 10 is in a failure state, and the R/D converter which is excellent in dynamic characteristics corresponding to the above-mentioned B is used, thereby being capable of increasing the control efficiency of the brushless motor 2. As a result, even if the motor itself is not increased in size, there can be provided the fail-safe sensor system in motor control which is high in reliability and dynamic characteristics.

As described above, according to the sensor system for controlling a motor of the present invention, the motor or the like can be downsized by the effective utilization of the motor. Also, the costs of the entire system can be suppressed by the downsized motor or the like. Further, the use of the R/D converter which is excellent in dynamic characteristics makes it possible to provide the sensor system for controlling a motor which is excellent in controllability and high in disturbance load fluctuation resistance. In addition, the sensor system having a redundancy can be structured without using a new sensor, and there can be provided the sensor system for controlling a motor which ensures fail safe against an unexpected failure of the motor.

As was described above, according to the present invention, there is provided a sensor system in motor control in a motor drive control system having a drive control circuit that controls the driving of a motor in accordance with an operation command, the system including a main angle detecting means having a resolver that detects the rotation angle of the motor, and a sub angle detecting means that estimates the rotation angle of the motor on the basis of the counter electromotive power of the motor, in which the main angle detecting means detects the rotation angle of the motor in a normal state, and the sub angle detecting means detects the rotation angle of the motor when the main angle detecting means is in failure. As a result, there can be provided the fail-safe sensor system used in the motor control which is small in size and low in price, and high in reliability and dynamic characteristics. Also, the sub angle detecting means includes a counter electromotive voltage detecting means that detects the counter electromotive voltage of the motor, and an angle estimating means that estimates the rotation angle of the motor on the basis of the counter electromotive voltage. Therefore, there can be provided the fail-safe sensor system in motor control which suppresses the costs of the entire system and improves in reliability.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A sensor system for controlling a motor in a motor drive control system having a drive control circuit (4) that controls the driving of a motor (2) in accordance with an operation command, the system comprising:
    a main angle detecting means (10) having a resolver (1) that detects the rotation angle of the motor (2); and
    a sub angle detecting means (11) that estimates the rotation angle of the motor (2) on the basis of the counter electromotive power of the motor (2),
    wherein the main angle detecting means (10) detects the rotation angle of the motor (2) in a normal state, and the sub angle detecting means (11) detects the rotation angle of the motor (2) when the main angle detecting means (10) is in failure.

2. A sensor system for controlling a motor according to claim 1, wherein the sub angle detecting means (11) includes a counter electromotive voltage detecting means (11A) that detects the counter electromotive voltage of the motor (2), and an angle estimating means (11B) that estimates the rotation angle of the motor (2) on the basis of the counter electromotive voltage.

* * * * *